United States Patent
Okumura et al.

(10) Patent No.: US 7,122,940 B2
(45) Date of Patent: Oct. 17, 2006

(54) MANIPULATOR

(75) Inventors: Ichiro Okumura, Chiba (JP); Tadashi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/362,191

(22) Filed: Feb. 27, 2006

(65) Prior Publication Data

US 2006/0138901 A1 Jun. 29, 2006

Related U.S. Application Data

(63) Continuation of application No. 10/799,595, filed on Mar. 15, 2004, now Pat. No. 7,081,700.

(30) Foreign Application Priority Data

Mar. 19, 2005 (JP) ............................ 2003-076655

(51) Int. Cl.
*H02N 2/00* (2006.01)
(52) U.S. Cl. .............................. 310/323.17
(58) Field of Classification Search ........... 310/323.12, 310/323.17, 323.18, 325
See application file for complete search history.

(56) References Cited

U.S. PATENT DOCUMENTS

| | | | |
|---|---|---|---|
| 4,523,120 A | 6/1985 | Assard et al. | 310/323.17 |
| 5,686,720 A | 11/1997 | Tullis | 250/208.1 |
| 6,380,660 B1 | 4/2002 | Maeno et al. | 310/323.02 |
| 6,404,104 B1 * | 6/2002 | Maeno et al. | 310/323.02 |
| 6,723,106 B1 | 4/2004 | Charles et al. | 606/130 |
| 6,819,029 B1 * | 11/2004 | Ohno et al. | 310/323.17 |
| 6,849,989 B1 * | 2/2005 | Schmid et al. | 310/328 |
| 7,049,730 B1 * | 5/2006 | Tessien et al. | 310/323.12 |
| 7,071,595 B1 * | 7/2006 | Schmid et al. | 310/323.17 |

FOREIGN PATENT DOCUMENTS

| | | |
|---|---|---|
| JP | 60-180794 | 9/1985 |
| JP | 5-123992 | 5/1993 |
| JP | 7-256575 | 10/1995 |
| JP | 10-65882 | 3/1998 |
| JP | 11-090867 | 4/1999 |
| JP | 11-220891 | 8/1999 |
| JP | 2000-055664 | 2/2000 |
| JP | 2000-202788 | 7/2000 |
| JP | 2001-276091 | 10/2001 |
| JP | 2002-85353 | 3/2002 |
| JP | 2002-272147 | 9/2002 |
| WO | WO 00/30186 | 11/1999 |

\* cited by examiner

*Primary Examiner*—Thomas M. Dougherty
(74) *Attorney, Agent, or Firm*—Fitzpatrick, Cella, Harper & Scinto

(57) ABSTRACT

A manipulator includes a spherical shell movable member, a manipulating member integrally mounted on the spherical shell movable member, and a vibration member in contact with the spherical shell movable member and vibrating so that the spherical shell movable member rotates about a plurality of axes. The manipulating member has a manipulation distal end portion placed near a center of the spherical shell movable member, and all of the axes intersect at one point near the center of the spherical shell movable member.

1 Claim, 8 Drawing Sheets

MANIPULATOR

This is a continuation application of Application Ser. No. 10/799,595, filed on Mar. 15, 2004 now U.S. Pat. No. 7,081,700.

FIELD OF THE INVENTION

The present invention relates to a manipulator such as a minute component assembly apparatus which assembles a minute object such as a micromachine component or unit by using a magnifying observation device such as an optical microscope, electron microscope, or scanning tunneling microscope, or a compact manipulator apparatus which performs diagnosis, medical treatment, research, biological production, or the like by physically manipulating, for example, minute tissues, cells, or genes of a living body and a minute object manipulating apparatus using the manipulator.

BACKGROUND OF THE INVENTION

There have been known a technique of controlling the posture of a manipulating member (end-effector) by rotating a general size arm using a general size bearing and a technique of performing a necessary process on a minute work in a working device by rotating an arm or tool along an arcuated guide (see, for example, Japanese Patent Laid-Open No. 7-256575).

In a conventional apparatus like those described above, if the distal end of an end-effector is not located on the rotation axis of a bearing or arcuated guide, the distal end of the end-effector moves out of the visual field or depth of focus of a microscope due to posture control operation. This makes it necessary to position the microscope and the distal end of the end-effector again. As described above, in a manipulator which manipulates a minute object, when the posture of the end-effector at the distal end is controlled, the manipulation target object often moves out of the visual field of the microscope. In a conventional manipulator having three degrees of rotational freedom, in particular, since the rotation axes corresponding to the respective degrees of freedom do not coincide with each other and do not cross at one point, the distal end of the end-effector tends to move out of the visual field or depth of focus of the microscope due to posture control operation. In such a case, the microscope and the distal end of the end-effector must be positioned again. This operation requires a long period of time.

SUMMARY OF THE INVENTION

It is an object of the present invention to provide a manipulator such as a compact manipulator apparatus which solves the above problems and manipulates a minute target object, and a minute object manipulating apparatus or the like using the manipulator.

In order to achieve the above object, according to the present invention, there is provided a manipulator comprising: a manipulation target object manipulating member being driven and controlled by a plurality of free rotation axes; all the plurality of free rotation axes crossing at one point; and, a manipulation distal end portion of the manipulating member being placed near the intersection.

According to this arrangement, the manipulator has a mechanism in which a plurality of (typically three) free rotation axes cross at one point, and the distal end portion of a manipulating member (end-effector) which manipulates a manipulation target object is placed near the intersection. With this structure, even if, for example, the posture of the end-effector is changed, its distal end portion can be made to remain within the visual field of a microscope.

The following embodiment can be provided on the basis of the above basic arrangement.

According to an embodiment of the present invention, the manipulating member is integrally mounted on a spherical shell movable member, the manipulation distal end portion of the manipulating member is placed near the center of the spherical shell movable member, the spherical shell movable member is in contact with a vibration member which can vibrate, and rotation of the spherical shell movable member around the center thereof is controlled by controlling vibration of the vibration member, thereby controlling a posture of the manipulating member.

When the rotation of the movable member in the form of a spherical shell is controlled by controlling the vibration of the vibration member, the distal end portion of the end-effector is made to remain within the visual field of the microscope even if the posture of the end-effector is changed.

According to another embodiment of the present invention, the manipulator further comprises: first rotating means for rotating a first rotating shaft on which a first arm is mounted; second rotating means for rotating a second rotating shaft which is mounted on the first arm and on which a second arm is mounted; and third rotating means for rotating a third rotating shaft which is mounted on the second arm and on which a third arm is mounted, wherein the manipulating member is mounted on the third rotating shaft, and the first, second, and third rotating shafts pass through a manipulation distal end portion of the manipulating member.

In addition, in order to achieve the above object, according to the present invention, there is provided a minute object manipulating apparatus comprising: a manipulator comprising a manipulation target object manipulating member being driven and controlled by a plurality of free rotation axes, all the plurality of free rotation axes crossing at one point, and a manipulation distal end portion of the manipulating member being placed near the intersection; a magnifying observation device for magnifying observation of the manipulation target object and the manipulation distal end portion of the manipulating member; and a remote controller for remotely controlling the manipulator.

This apparatus also makes the most of the advantages of the above manipulator. In addition, for example, the manipulator can be placed on the upper side of a manipulation target object, and the magnifying observation device can be placed on the lower side of the manipulation target object.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

(First Embodiment)

The first embodiment of the present invention will be described first with reference to FIGS. 1 and 2A to 2D. This embodiment uses a mechanism in which all the axes corresponding to three degrees of rotational freedom cross at one point. In this system, the center of the distal end manipulating portion of an end-effector is placed near the center of the spherical rotating member of a vibration actuator having three degrees of freedom like the one disclosed in Japanese Patent Laid-Open No. 11-220891. In such a vibration actuator, rotation axes can be arbitrarily set. Since all the rotation axes pass through the center of a spherical rotating member, a simple system with high rigidity can be formed by using this actuator. As a sensor for feeding back the position and velocity of the spherical rotating member, a two-dimensional position sensor using a detection principle like that disclosed in Japanese Patent Laid-Open No. 10-65882 is suitably used. This sensor irradiates a spherical surface with light emitted from an irradiation source based on the optical mouse system or the like to form an irradiation pattern constituted by a high-luminance region and a relatively low-luminance region corresponding to the minute shape of the spherical surface. Movement information is then obtained by using the movement of the irradiation pattern based on the relative movement between the spherical surface and the sensor.

Figure 1:
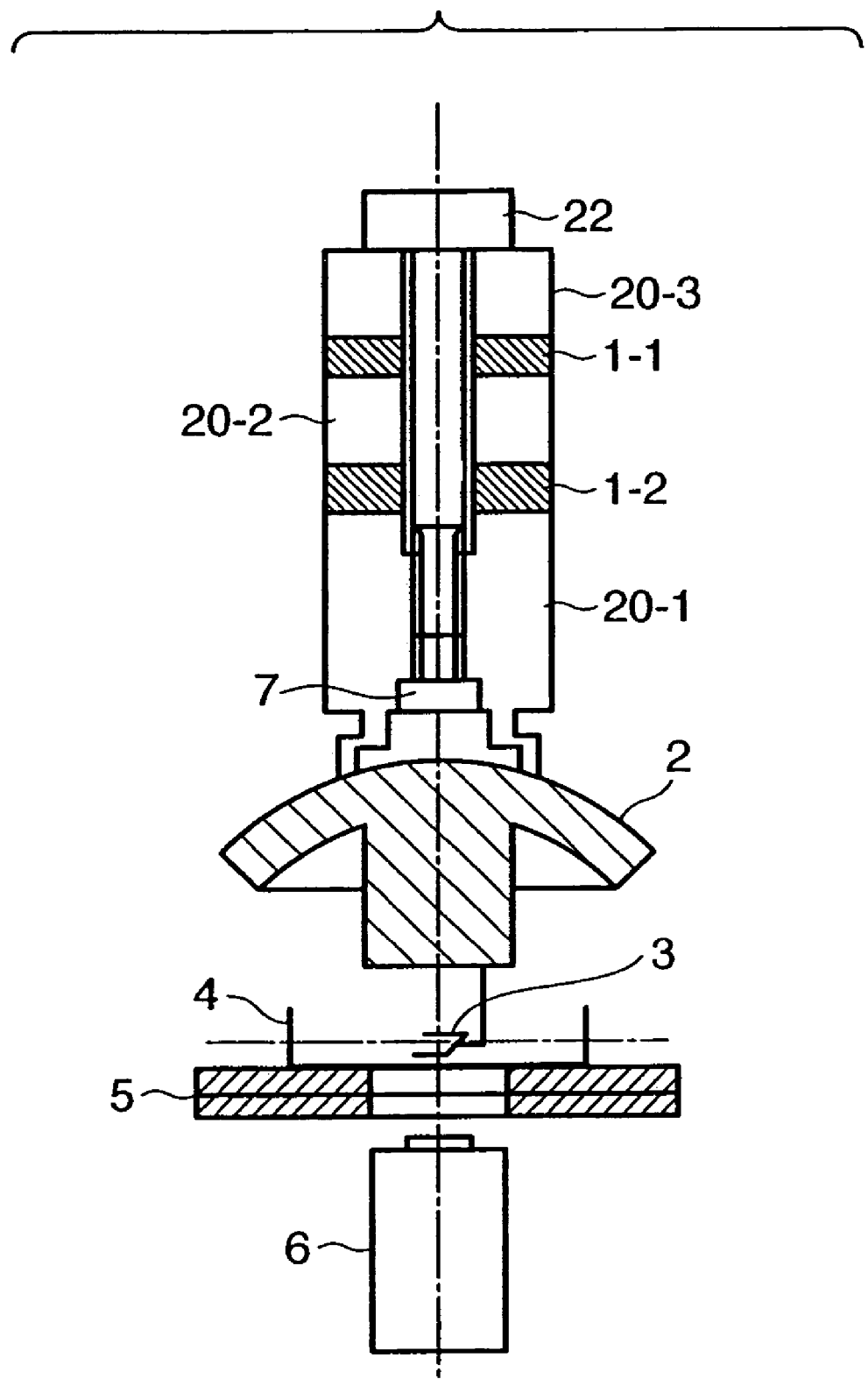
FIG. 1 is a view for explaining the main part of the first embodiment.

FIG. 1 is a view which is most indicative of the main part of this embodiment. Reference numerals 20-1, 20-2, and 20-3 denote the first, second, and third elastic member vibration elements of a multiple degree-of-freedom vibration actuator, respectively; and 1-1 and 1-2, piezoelectric ceramics which generate bending vibrations and longitudinal vibrations, respectively. Each vibration element 20 is fixed/supported on a frame (not shown) with an arm portion (see 1-2' in FIG. 6) extending from an electrode plate portion for a piezoelectric ceramic in the radial direction. The driving principle and arrangement of the multiple degree-of-freedom vibration actuator will be described in detail later.

Reference numeral 2 denotes a movable member in the form of a spherical shell whose spherical surface comes into contact with the vibration element 20-1. In this embodiment, only a portion of the movable member 2 is a spherical surface, which comes into contact with the vibration element 20-1. The mechanism of driving control will be described later. Reference numeral 3 denotes a micro-hand which is integrally mounted on the mount portion of the lower portion of the movable member 2 in the form of a spherical shell. The micro-hand 3 has manipulation functions such as a function of grasping or releasing a minute object such as a cell and a function of performing a process such as forming a hole in a minute object or cutting it. The micro-hand 3 is placed near the center of the spherical surface of the movable member 2. Reference numeral 4 denotes a vessel in which a minute object such as a cell is stored. The vessel 4 is made of a transparent material such as glass. A liquid such as physiological saline solution is often contained in the vessel 4. Reference numeral 5 denotes an X-Y or X-Y-Z stage which can adjust the relative position between the micro-hand 3 and a minute object as a manipulation target object by adjusting the position of the vessel 4 on the stage; and 6, a magnifying observation device such as a microscope, which magnifies images of the manipulation target object and micro-hand 3 to allow observation of them. Referring to FIG. 1, the magnifying observation device 6 allows observation from below the transparent vessel 4 through the hole in the center of the X-Y-Z stage 5. Reference numeral 7 denotes a magnet which attracts and holds the movable member 2 made of iron, and also has a function of bringing the spherical surface of the movable member 2 into contact with the vibration element 20-1 with a constant pressure.

Figures 2A, 2B, 2C, 2D:
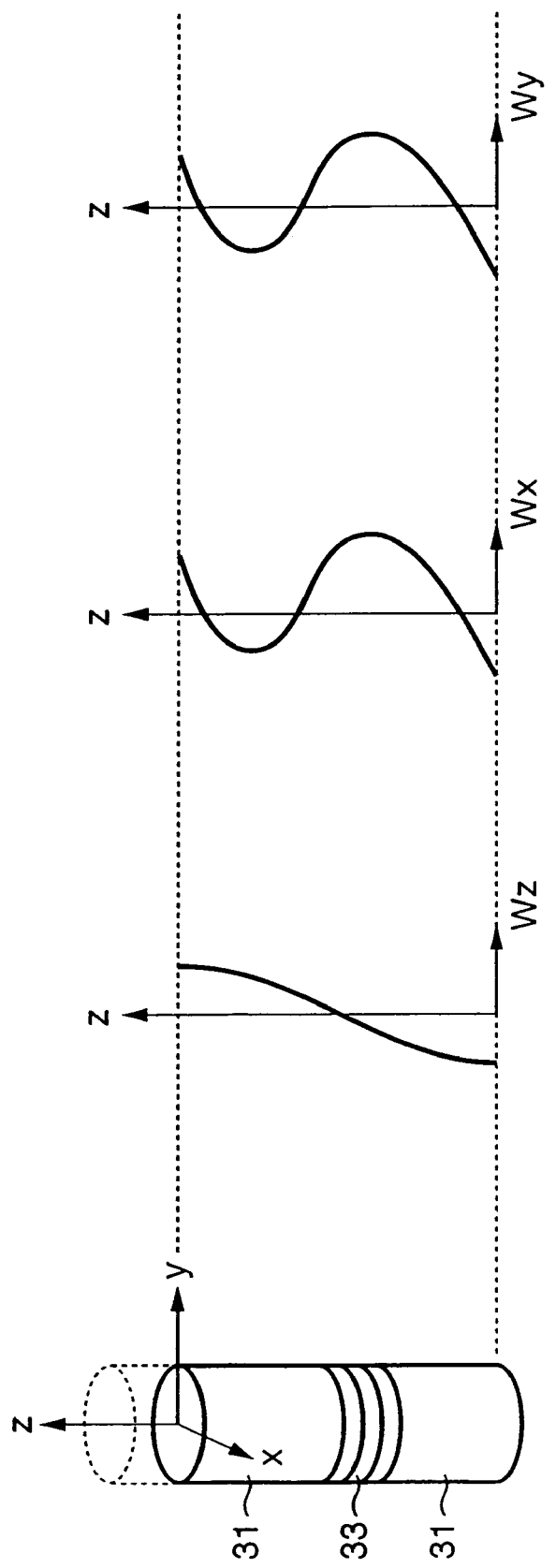
FIGS. 2A to 2D are views for explaining the driving principle of a multiple degree-of-freedom vibration actuator used in the first embodiment.

The details of the multiple degree-of-freedom vibration actuator will be described. FIGS. 2A to 2D show the driving principle of this vibration actuator. A piezoelectric element 33 serving as an electromechanical energy converting element which provides the displacements shown in FIGS. 2B to 2D is clamped/fixed between cylindrical elastic members 31 each serving as a single vibration member. The piezoelectric element is formed by stacking a plurality of single piezoelectric element plates with electrode plates being inserted between the piezoelectric element plates as needed. This allows an alternating signal for driving to be applied to each necessary piezoelectric element plate. In this case, the piezoelectric element 33 repeats expansion and contraction displacements in the axial direction upon application of alternating signals, and includes the first piezoelectric element which excites longitudinal vibration as a displacement in the direction of the z-axis of the three axes, i.e., the x-axis, y-axis, and z-axis, as shown in FIG. 2B, the second piezoelectric element which excites transverse (bending) vibration within the z-x plane as shown in FIG. 2C, and the third piezoelectric element which excites transverse (bending) vibration within the z-y plane as shown in FIG. 2D. The above first piezoelectric element is uniformly polarized in the thickness direction. Each of the second and third piezoelectric elements is polarized such that the portions on both sides of the diameter have opposite polarities in the thickness direction.

When, for example, alternating signals having a phase difference of 90° are applied to the second and third piezoelectric elements, two bending vibrations in the vibration member combine to form an elliptic motion around the z-axis (within the x-y plane) on the surface of the vibration member. In this case, since the natural frequency of the vibration member with respect to the x-axis is almost equal to that with respect to the y-axis, the above elliptic vibration can be generated by applying alternating signals having this natural frequency as a driving frequency to the second and third piezoelectric elements.

When an alternating signal having a frequency almost equal to the natural frequency in the z-axis direction of the vibration member is applied to the first piezoelectric element, the vibration member repeats longitudinal vibration of the primary mode at a predetermined period. In this case, when an alternating signal is applied to the second piezoelectric element to excite vibration of one period matching (almost matching) with one period of longitudinal vibration in the vibration member, an elliptic motion is produced within the x-z plane at a point on the surface of the vibration member, thereby obtaining a driving force in the x-axis direction (around the y-axis). In this case, since the natural frequency of the vibration member in the z-axis direction differs from the natural frequency of the primary mode of bending vibration in the x-z plane, the second piezoelectric element is driven in the secondary mode of the natural frequency of bending vibration in the x-axis direction, thereby matching the period of longitudinal vibration with the period of bending vibration, as shown in FIG. 2C.

Likewise, when an alternating signal is applied to the third piezoelectric element to excite vibration of one period matching (almost matching) with one period of longitudinal vibration in the vibration member, an elliptic motion is produced within the y-z plane at a point on the surface of the vibration member, thereby obtaining a driving force in the y-axis direction (around the x-axis). In this case, since the natural frequency of the vibration member in the z-axis direction differs from the natural frequency of bending vibration within the y-z plane, the third piezoelectric element is driven in the secondary mode of the natural frequency of bending vibration in the y-axis direction, thereby matching the period of longitudinal vibration with the period of bending vibration, as shown in FIG. 2D. That is, when an alternating signal having a frequency similar to the natural frequency of a vibration member 1, e.g., an AC voltage, is applied to the first, second, and third piezoelectric elements, longitudinal vibration or transverse (bending) vibration having a natural frequency is excited in the vibration member as shown in FIGS. 2B to 2D. When an alternating signal is selectively applied to two of the first, second, and third piezoelectric elements, the longitudinal vibration of the vibration member 1 is combined with transverse (bending) vibration in a direction perpendicular to that of the longitudinal vibration to produce an elliptic motion at a point on the surface of the vibration member 1. For example, the vibrations shown in FIGS. 2B and 2C are combined with each other to produce an elliptic motion within the x-z plane. When the vibrations shown in FIGS. 2B and 2D are combined with each other, an elliptic motion within the y-z plane is produced. When the vibrations shown in FIGS. 2C and 2D are combined with each other, an elliptic motion within the x-y plane is produced.

When, therefore, a movable member (the movable member 2 in FIG. 1) is pressed against a portion of the vibration member, the movable member can be driven in a plurality of directions. In this case, elliptic motions around the three axes (within three orthogonal planes) can be produced by combining three-phase piezoelectric elements (first, second, and third piezoelectric elements). This makes it possible to realize a vibration actuator which can be driven within three orthogonal planes by using a single vibration member.

FIG. 1 shows the basic arrangement of a vibration member in the vibration actuator of this embodiment shown in FIG. 1. In this case, the vibration member includes the first elastic member vibration element 20-1 having a female threaded portion formed in the inner diameter portion and the second and third elastic member vibration elements 20-2 and 20-3 each having a hole formed in a central portion. The piezoelectric elements 1-2 and 1-1 are placed between the first elastic member vibration element 20-1 and the second elastic member vibration element 20-2 and between the second elastic member vibration element 20-2 and the third elastic member vibration element 20-3. A fastening bolt 22 which is inserted from the third elastic member vibration element 20-3 side and serves as a central shaft member is screwed in the female threaded portion of the first elastic member vibration element 20-1. With this structure, the piezoelectric elements 1-2 and 1-1 are clamped between the first elastic member vibration element 20-1 and the second elastic member vibration element 20-2 and between the second elastic member vibration element 20-2 and the third elastic member vibration element 20-3 so as to be integrally coupled to each other.

In this embodiment, the piezoelectric element 1-2 placed between the first elastic member vibration element 20-1 and the second elastic member vibration element 20-2 is the first piezoelectric element which excites, for example, longitudinal vibration in the vibration member. The piezoelectric element 1-1 placed between the second elastic member vibration element 20-2 and the third elastic member vibration element 20-3 includes the second piezoelectric element which produces bending vibration within the x-z plane and the third piezoelectric element which produces bending vibration within the y-z plane. The second and third piezoelectric elements are so positioned as to have a phase difference of 90°.

The inner surface of the distal end portion of the first elastic member vibration element 20-1, which comes into contact with the movable member 2 in the form of a spherical shell and is oblique with respect to the axis, is formed into a tapered surface. In this embodiment, therefore, the movable member 2 in the form of a spherical shell can be rotated about the x-axis, y-axis, and z-axis by combining two kinds of vibrations of longitudinal vibration and vibrations in the two directions which are produced in the vibration member. For example, a combination of the vibrations shown in FIGS. 2B and 2D can rotate the movable member 2 about the z-axis, a combination of the vibrations shown in FIGS. 2B and 2C can rotate the movable member 2 about the y-axis, and a combination of the vibrations shown in FIGS. 2B and 2D can rotate the movable member 2 about the x-axis. That is, the movable member 2 can rotate about three orthogonal axes. By controlling the vibrations of the vibration elements 20, the movable member 2 can be rotated/controlled about an arbitrary axis. In this case, since the micro-hand 3 is located at the center of the spherical surface of the movable member 2, only the posture of the micro-hand 3 always changes at the same position. Even if posture control operation is done, since the position of the micro-hand 3 does not change, the manipulation target object never moves out of the visual field of the microscope 6.

The above description has exemplified control on the posture of the micro-hand 3. When, however, the posture of a manipulation target object such as a cell is to controlled, it suffices if the posture of the micro-hand 3 is changed after the manipulation target object is grasped by the micro-hand 3, and then the manipulation target object is released. In this case as well, since the position of the manipulation target object does not change, it never moves out of the visual field of the microscope 6.

In the apparatus of this embodiment, the relative position of a manipulation target object can be adjusted by the X-Y-Z stage 5, and the posture and direction of the object can be adjusted by controlling the vibrations of the vibration elements 20-1 to 20-3.

Although FIG. 1 shows the rod-like vibration elements, vibration elements like those shown in FIGS. 3A to 3D or FIGS. 4A to 4D may be used. According to the form of the vibration actuator shown in FIGS. 3A to 3D, a single vibration member 200 is formed by joining a cylindrical elastic member 201 to a disk-like elastic member 202. The elastic member 201 is actually divided into two portions, and piezoelectric elements 203 and 204 serving as two electro-mechanical energy converting elements are clamped between the two portions. Piezoelectric elements 205a to 205d serving as four electro-mechanical energy converting elements are arranged on the surface of the disk-like elastic member 202.

Figure 3A:
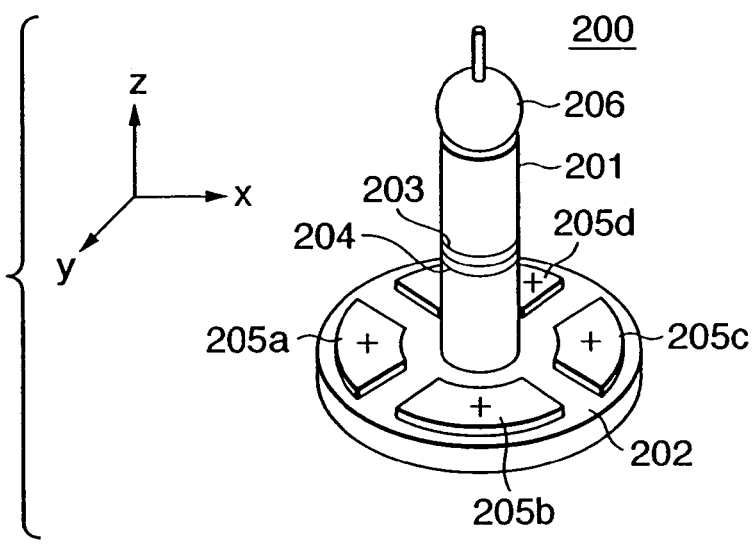
FIGS. 3A to 3D are views for explaining another example of the multiple degree-of-freedom vibration actuator.
Figure 3B:
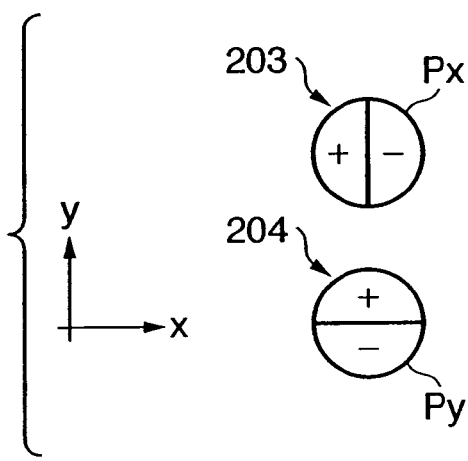
Figure 3C:
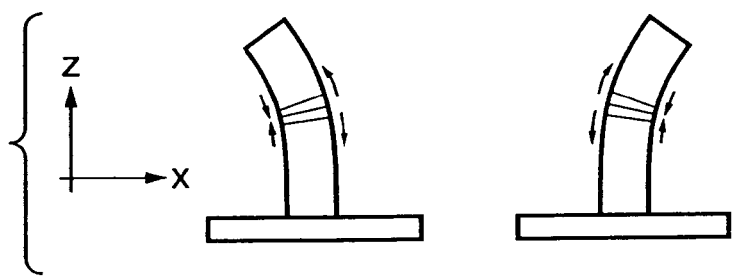
Figure 3D:
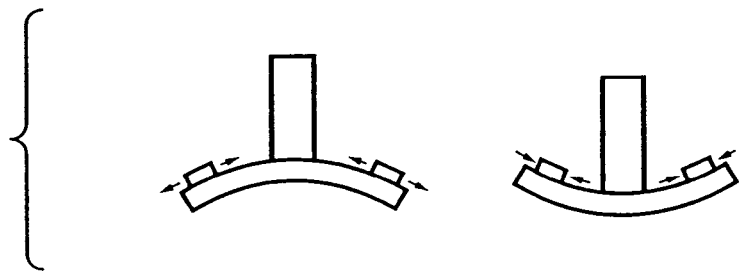

The piezoelectric element 203 is used to displace the elastic member 201 serving as a driving portion in the x-axis direction, as shown in FIG. 3C. The piezoelectric element 204 is used to displace the elastic member 201 in the y-axis direction. As shown in FIG. 3B, the piezoelectric elements 203 and 204 have a polarization phase difference of 90°. On the other hand, all the piezoelectric elements 205a to 205d are polarized to have the same characteristics. When the disk-like elastic member 202 is bent as shown in FIG. 3D, the elastic member 201 serving as a driving portion is displaced in the z-axis direction.

A spherical movable member 206 (the movable member 2 in FIG. 1) is in contact with the elastic member 201 serving as a driving portion. The movable member 206 can be rotated about the x-axis by supplying alternating signals to the piezoelectric element 204 and the piezoelectric elements 205a to 205d with, for example, a phase difference of 90°. By supplying alternating signals to the piezoelectric element 203 and the piezoelectric elements 205a to 205d with, for example, a phase difference of 90°, the movable member 206 can be rotated about the y-axis. When the movable member 206 is to be rotated about z-axis, alternating signals are supplied to the piezoelectric elements 203 and 204 with, for example, a phase difference of 90°.

Figure 4A:
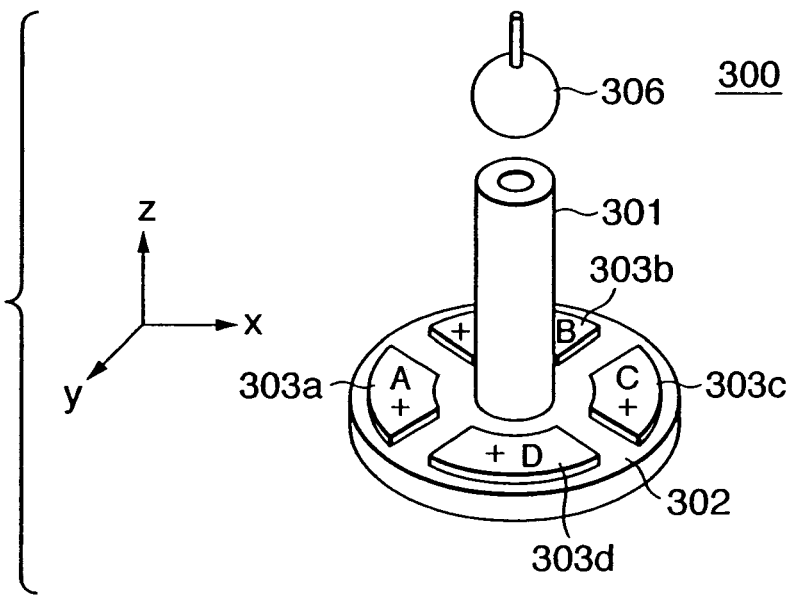
FIGS. 4A to 4D are views for explaining still another example of the multiple degree-of-freedom vibration actuator.
Figure 4B:
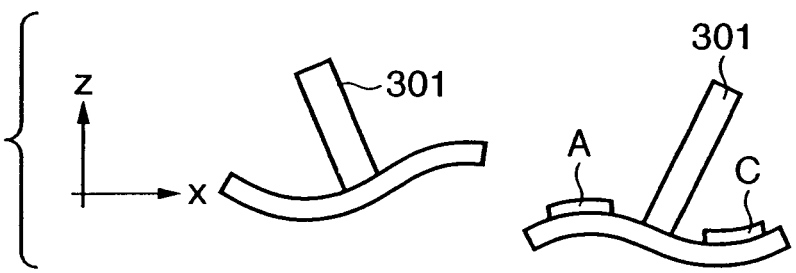
Figure 4C:
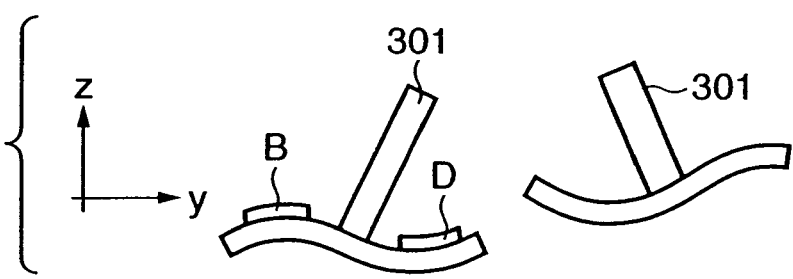
Figure 4D:
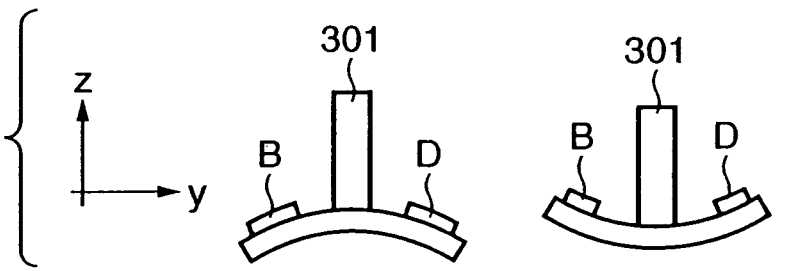

According to the form of the vibration actuator shown in FIGS. 4A to 4D, a single vibration member 300 is formed by joining a cylindrical elastic member 301 to a disk-like elastic member 302. The elastic member 301 incorporates a permanent magnet (not shown) to always attract a movable member 306 (the movable member 2 in FIG. 1) made of a magnetic material so as to obtain a pressing force. Four piezoelectric elements (polarized regions) 303a to 303d serving as electro-mechanical energy converting elements are arranged on the surface of the elastic member 302. By selectively supplying alternating signals to the piezoelectric elements 303a to 303d, the elastic member 301 serving as a driving portion can be displayed in the x-axis direction, y-axis direction, or z-axis direction, as shown in FIGS. 4B to 4D. When the movable member 306 is to be rotated about the x-axis, a displacement in the y-axis direction (FIG. 4C) and a displacement in the z-axis direction (FIG. 4D), may be provided with, for example, a phase difference of 90°. When the movable member 306 is to be rotated about the y-axis, a displacement in the x-axis direction (FIG. 4B) and a displacement in the z-axis direction (FIG. 4D) may be provided with, for example, a phase difference of 90°. When the movable member 306 is to be rotated about the z-axis, a displacement in the x-axis direction (FIG. 4B) and a displacement in the y-axis direction (FIG. 4C) may be provided with, for example, a phase difference of 90°. Alternating signals are supplied to the piezoelectric elements 303a to 303d in the same manner as in the form shown in FIGS. 3A to 3D.

Figure 5:
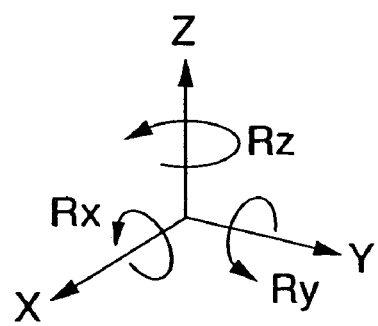
FIG. 5 is a view for explaining still another example of the multiple degree-of-freedom vibration actuator.
Figure 5:
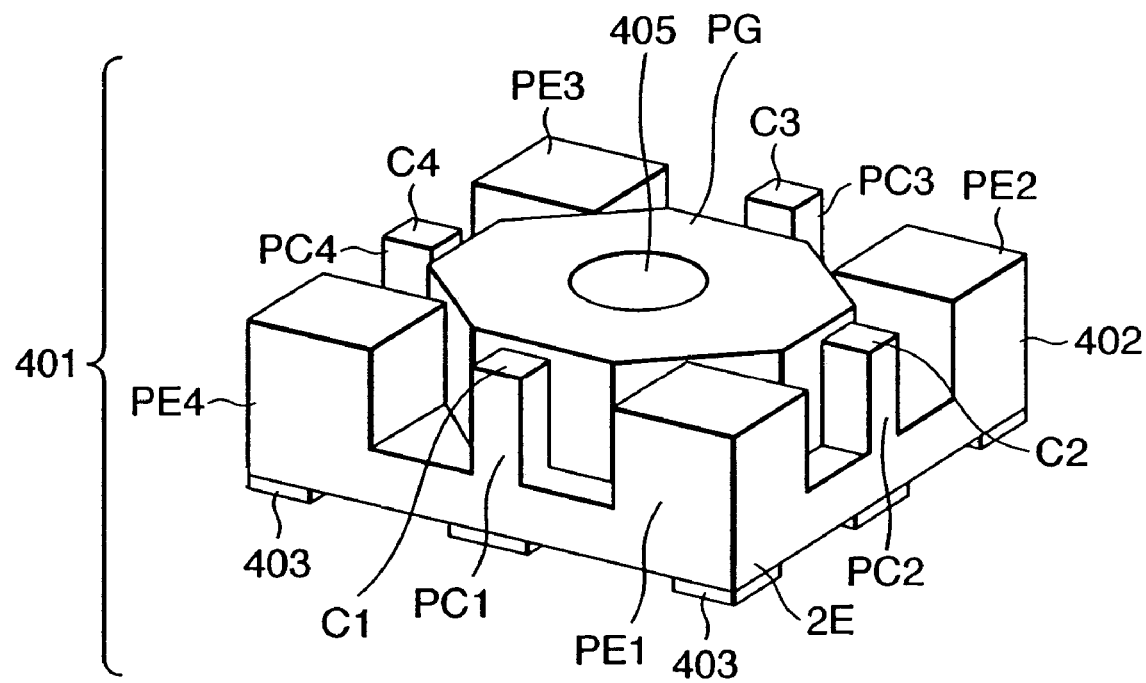

Alternatively, a plate-like vibration member like the one disclosed in Japanese Patent Laid-Open No. 2002-272147 may be used. FIG. 5 shows this vibration member. In this case, contact projections PC1 to PC4 are integrally formed at almost the middle portions of the four sides of a plate-like vibration member 402. A projection PG having a magnet 405 for attracting a movable member (the movable member 2 in FIG. 1) is formed at a central portion of the vibration member, and projections PE1 to PE4 are formed at the four corners of the vibration member. A vibration element 401 is formed by bonding/fixing a piezoelectric element 403 to the vibration member 302. The piezoelectric element 403 is driven to excite three different natural vibration modes in the vibration element 401. Combining these modes makes it possible to realize multiple degree-of-freedom driving, e.g., rotation about three orthogonal axes and rotation in two directions and about one axis.

Referring to FIG. 1, the micro-hand 3 serving as an end-effector is placed in the center of the spherical movable member 2. However, the present invention is not limited to this. For example, the micro-hand 3 may be replaced with a micro-tool which cuts a manipulation target object or forms a hole in the object.

(Second Embodiment)

Figure 6:
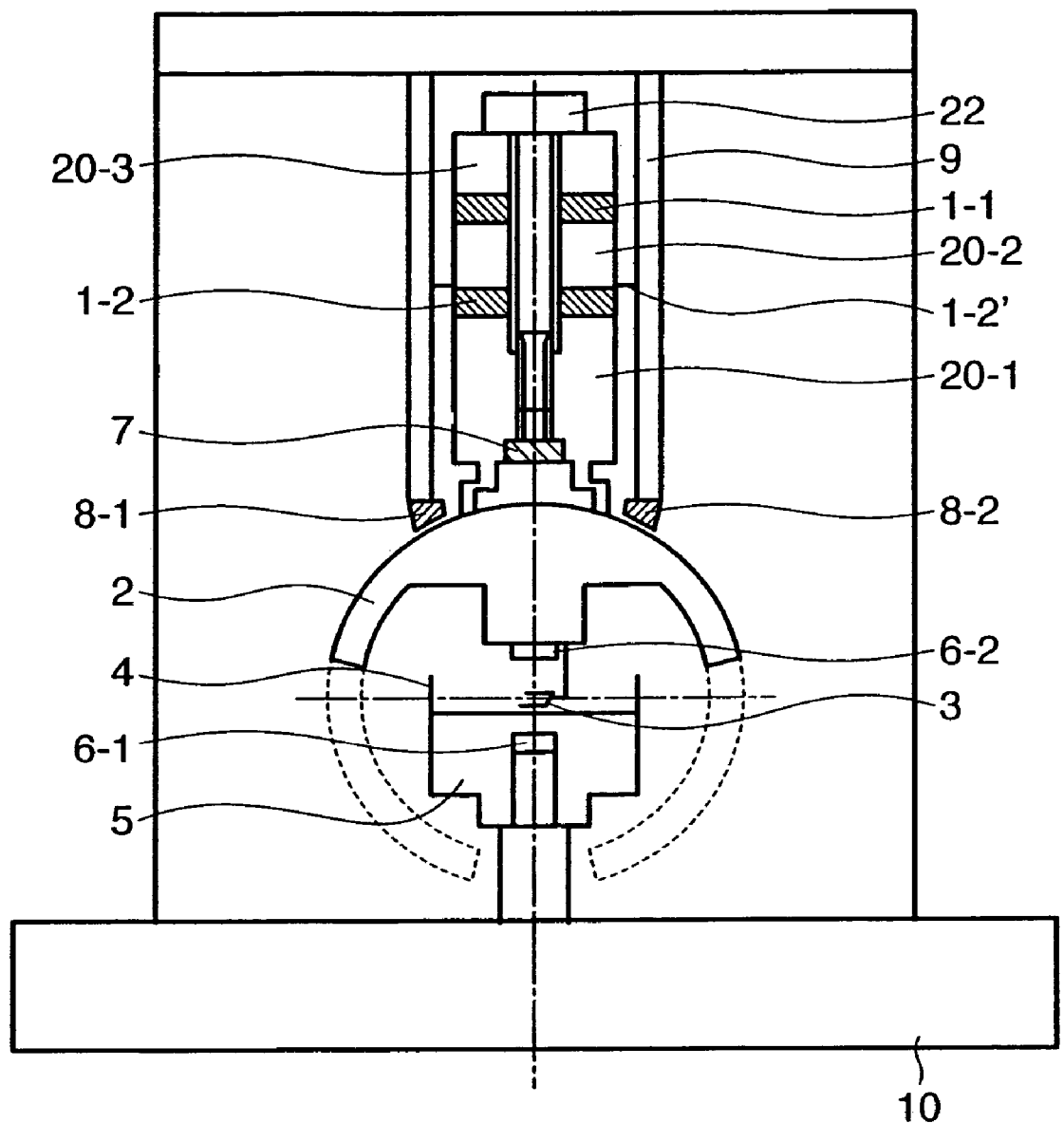
FIG. 6 is a view for explaining the second embodiment.

FIG. 6 is a view for explaining the second embodiment of the present invention. Since reference numerals 1 to 5, 7, 20, and 22 in FIG. 1 denote the same parts as in FIG. 6, a description thereof will be omitted. Reference numerals 6-1 and 6-2 denote microscopes for magnifying observation. In this embodiment, more visual information is acquired by using two microscopes placed at upper and lower positions, thereby improving operability. The two microscopes may have the same magnification power. However, decreasing the magnification of the lower microscope 6-1 to allow observation with a wide visual field will allow both observation with a low magnification and a wide visual field and observation with a high magnification and a narrow visual field.

Reference numerals 8-1 and 8-2 denote optical sensors, which detect relative position changes of vibration elements 20 and movable member 2. A technique like that disclosed in Japanese Patent Laid-Open No. 10-65882 can be used. The sensors 8-1 and 8-2 are identical sensors. The rotation axis and rotational speed of the movable member 2 can be obtained from movement information at two positions on the spherical surface. The sensors 8-1 and 8-2 are not limited to this system as long as they are two-dimensional position sensors. Although an example of a non-contact optical system is shown in FIG. 6, for example, a ball mouse system may be used, in which the rotation of balls in contact with the movable member 2 is separately detected as rotation components around two axes in two directions. The sensors 8-1 and 8-2 are mounted on a base 10 with a fixed frame 9. The vibration elements 20 are mounted on the fixed frame 9 with arm portions 1-2, radially extending from an electrode plate portion for a piezoelectric ceramic 1-2. Other points are the same as those in the first embodiment.

Figure 7:
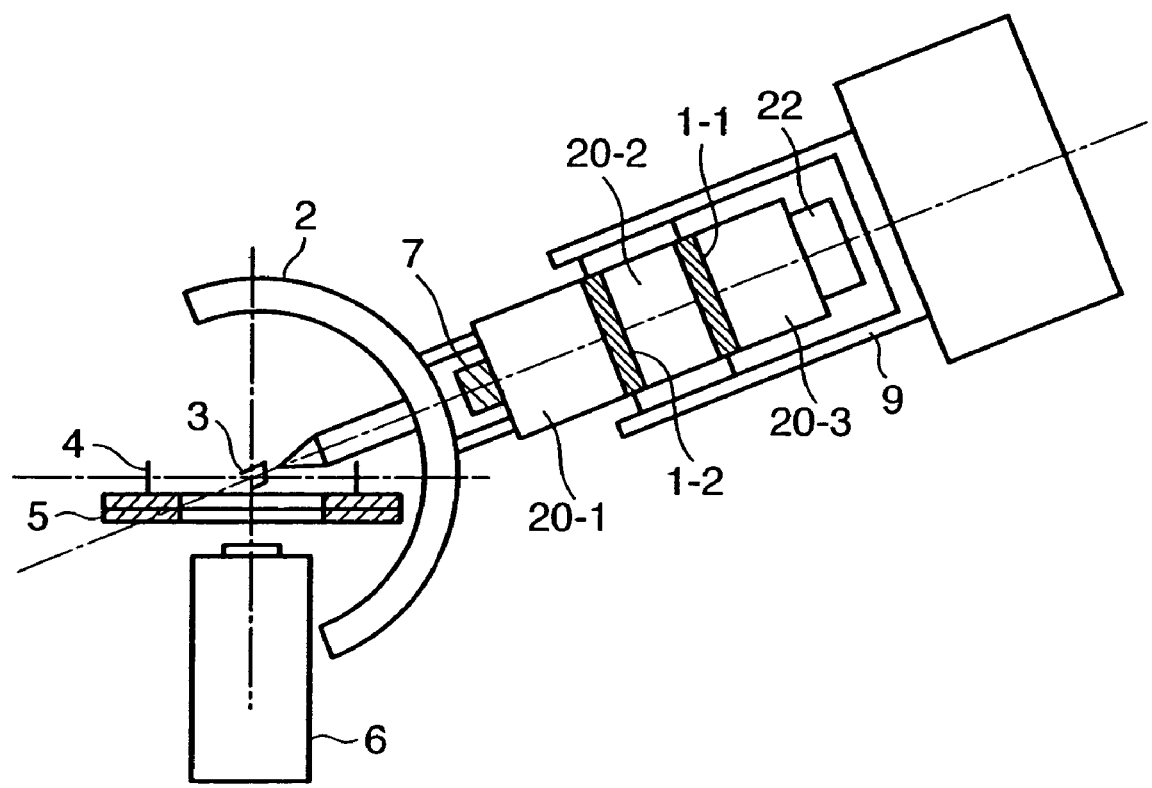
FIG. 7 is a view showing a modification of the above embodiment.

FIG. 7 shows a modification in which the axis of the multiple degree-of-freedom vibration actuator is tilted. For example, the structure shown in FIG. 7 is effective for a case wherein two micro-hands 3 are used. The multiple degree-of-freedom vibration actuator may be located in any direction as long as the microscope 6 and stage 5 do not interfere with each other even if the spherical shell of the movable member 2 rotates in various directions. However, a wider movable range of the movable member 2 can be ensured by matching the optical axis of the microscope 6 with the axis of the multiple degree-of-freedom vibration actuator as shown in FIGS. 1 and 6.

(Third Embodiment)

Figure 8:
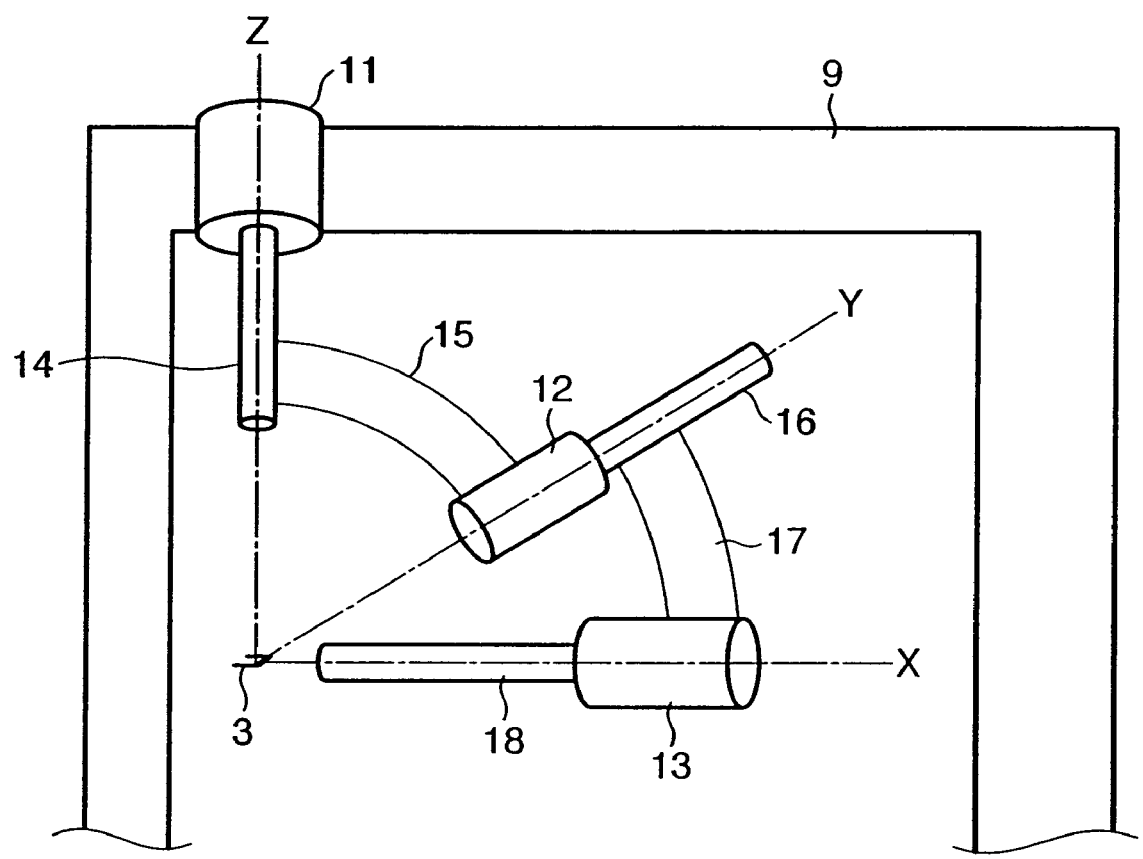
FIG. 8 is a view for explaining the main part of the third embodiment.

FIG. 8 is a view for explaining the third embodiment. In this system, the rotating axes, each having one degree of freedom, are made to cross at one point, and the center of an end-effector is located near the intersection. Each axis is driven and controlled by a general rotary motor. However, an ultrasonic motor, electrostatic motor, or the like may be used. A system can be formed by using a general rotary encoder as a sensor which feeds back position information and velocity information.

FIG. 8 shows only a mechanism which controls the posture of a micro-hand 3. Although an X-Y-Z stage 5 and microscope 6 are arranged in the same manner as in the above embodiments, an illustration thereof is omitted in FIG. 8. Reference numeral 11 denotes a general rotary motor, which incorporates a position sensor such as an encoder. The rotary motor 11 is fixed to a fixed frame 9 along the z-axis which is the optical axis of the microscope 6 (not shown). An arm 15 is mounted on a rotating shaft 14. A rotary motor 12 similar to the rotary motor 11 is mounted on the distal end of the arm 15. An axis Z of the rotary motor 11 is perpendicular to an axis Y of the rotary motor 12. An arm 17 is also mounted on a rotating shaft 16 of the rotary motor 12. A similar rotary motor 13 is also mounted on the distal end of the arm 17. The axis Y of the rotary motor 12 is perpendicular to an axis X of the rotary motor 13. The micro-hand 3 is mounted on the distal end of a rotating shaft 18 of the rotary motor 13. The rotating shafts of the rotary motors 11, 12, and 13 pass through the distal end portion of the micro-hand 3. In this mechanism as well, the position of the distal end portion of the micro-hand 3 does not change regardless of how the rotary motors 11, 12, and 13 rotate, and hence the same function as that in the first embodiment is realized.

Although the X- and Y-axes, and the Y- and Z-axes intersect at right angles, the X- and Z-axes need not necessarily intersect at a right angle. Although the mechanism of the first embodiment is simpler and has higher rigidity, it requires relatively complicated control. In contrast to this, the mechanism of the third embodiment is relatively complicated and has lower rigidity, but requires only simple control.

As has been described above, the manipulator according to a preferred embodiment of the present invention has a mechanism in which all rotatable shafts cross at one point, and the distal end portion of a manipulating member (end-effector) which manipulates a manipulation target object is placed near the intersection. With this structure, even if the posture of the manipulating member is changed, its distal end does not move. When, therefore, the operator is to manipulate a manipulation target object while observing it with a microscope or the like, the object can be made to always remain in the visual field. This eliminates the necessity of positioning the microscope and end-effector again every time the position of the end-effector or manipulation target object (e.g., a minute object) is controlled. Therefore, very efficient operation can be performed.

As many apparently widely different embodiments of the present invention can be made without departing from the spirit and scope thereof, it is to be understood that the invention is not limited to the specific embodiments thereof except as defined in the claims.

What is claimed is:

1. A manipulator comprising:
    a spherical shell movable member;
    a manipulating member integrally mounted on said spherical shell movable member; and
    a vibration member being in contact with said spherical shell movable member and vibrating so that said spherical shell movable member rotates about a plurality of axes, wherein
    said manipulating member has a manipulation distal end portion placed near a center of said spherical shell movable member, and
    all the plurality of axes intersect at the center of said spherical shell movable member.

* * * * *

UNITED STATES PATENT AND TRADEMARK OFFICE
CERTIFICATE OF CORRECTION

| | | |
|---|---|---|
| PATENT NO. | : 7,122,940 B2 | Page 1 of 1 |
| APPLICATION NO. | : 11/362191 | |
| DATED | : October 17, 2006 | |
| INVENTOR(S) | : Ichiro Okumura et al. | |

It is certified that error appears in the above-identified patent and that said Letters Patent is hereby corrected as shown below:

On The Title Page Item
[30] FOREIGN APPLICATION PRIORITY DATA:

"Mar. 19, 2005" should read --Mar. 19, 2003--.

COLUMN 4:

Line 29, "electromechanical" should read --electro-mechanical--.

Signed and Sealed this

Eleventh Day of December, 2007

JON W. DUDAS
*Director of the United States Patent and Trademark Office*